O. CRELL.
MULTIPLE TURRET LATHE.
APPLICATION FILED SEPT. 21, 1909.

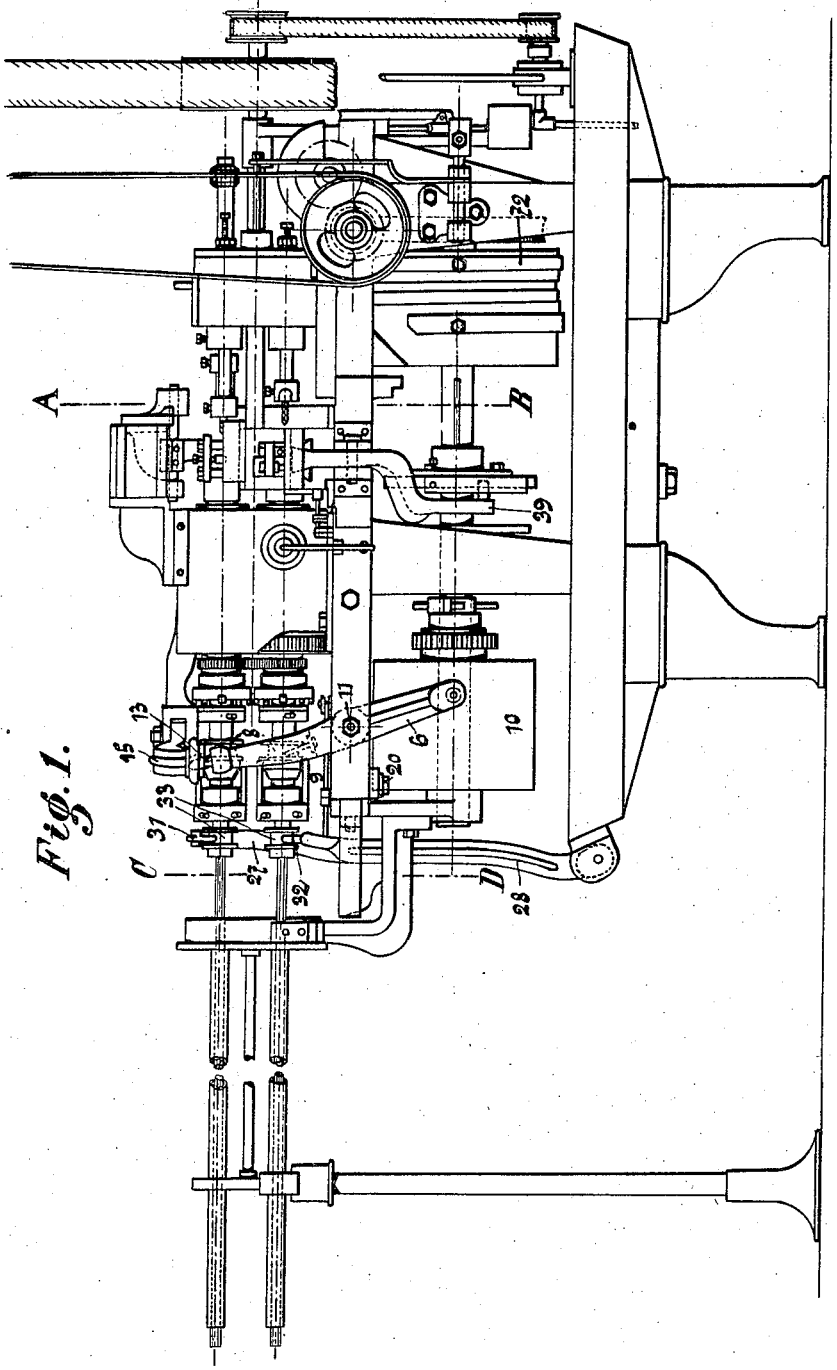

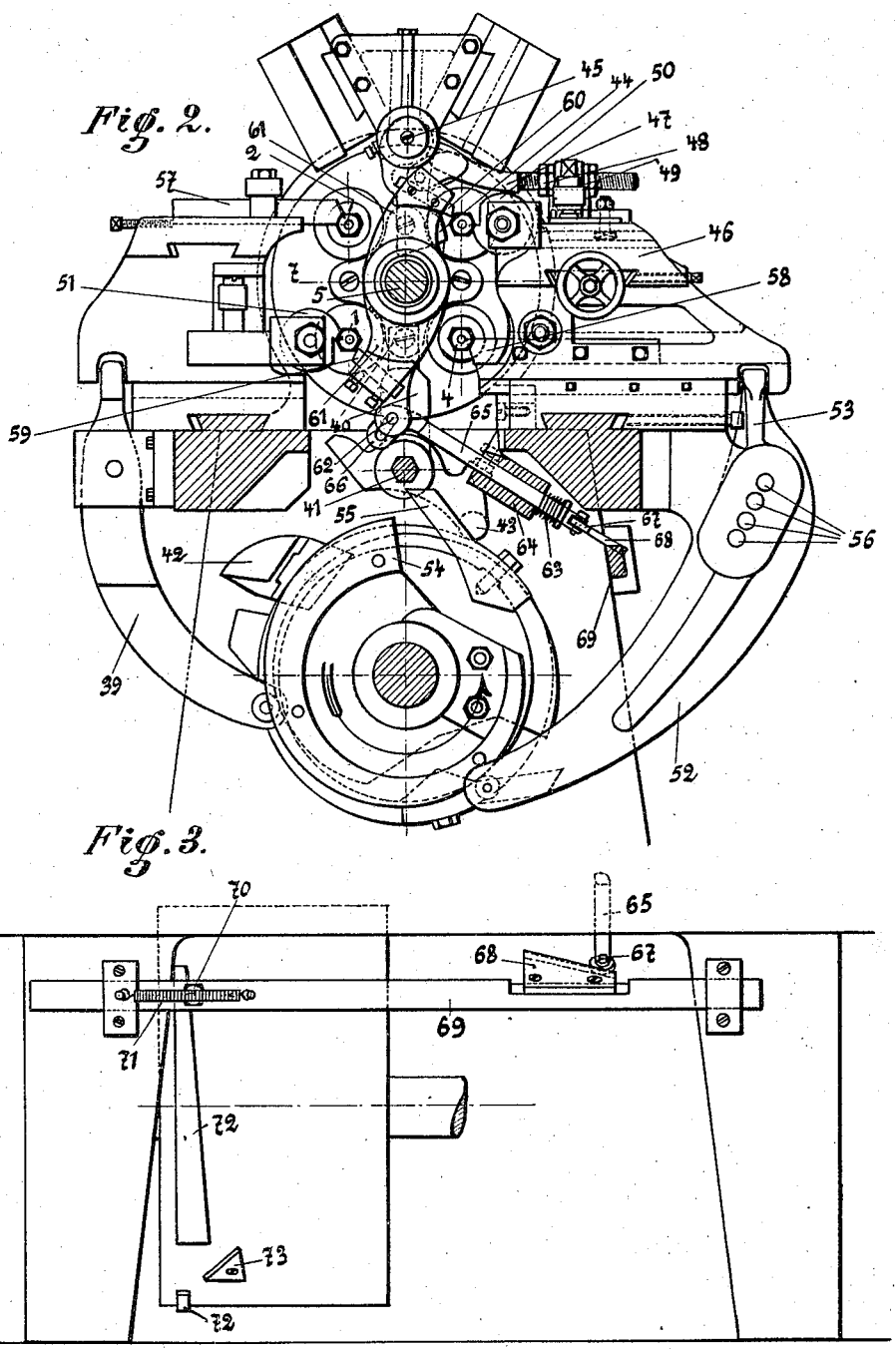

999,435.

Patented Aug. 1, 1911.
5 SHEETS—SHEET 5.

UNITED STATES PATENT OFFICE.

OTTO CRELL, OF DUSSELDORF, GERMANY, ASSIGNOR TO THE FIRM OF A. EHRENREICH & CIE., OF DUSSELDORF-OBERKASSEL, GERMANY.

MULTIPLE TURRET-LATHE.

999,435.      Specification of Letters Patent.      Patented Aug. 1, 1911.

Application filed September 21, 1909. Serial No. 518,739.

*To all whom it may concern:*

Be it known that I, OTTO CRELL, a citizen of the German Empire, residing at Dusseldorf, Germany, have invented an Improved Multiple Turret-Lathe, of which the following is a specification.

This invention relates to a multiple turret lathe which is adapted to substantially increase the output of the machines as now generally constructed.

Figure 4:
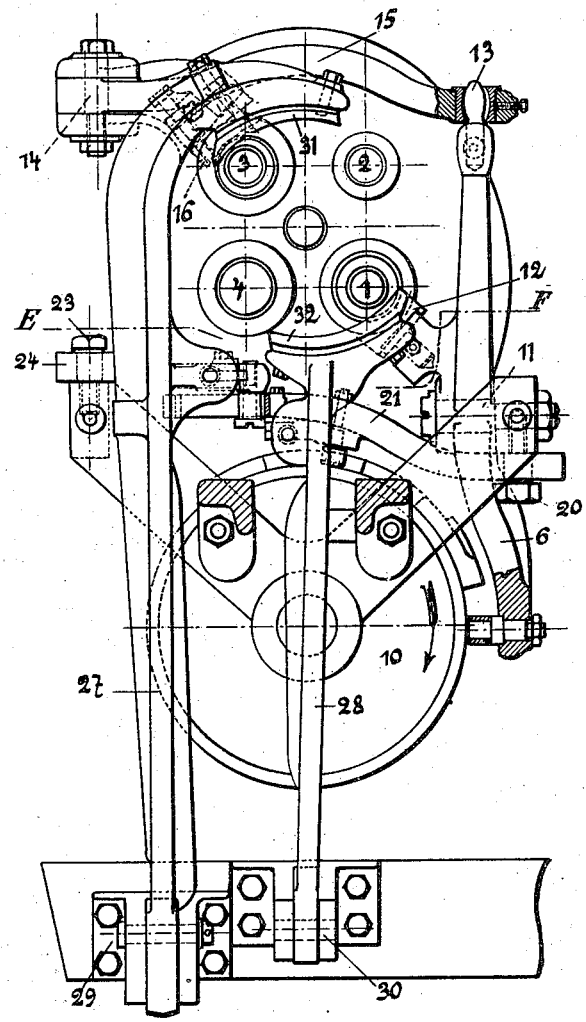
Figure 6:
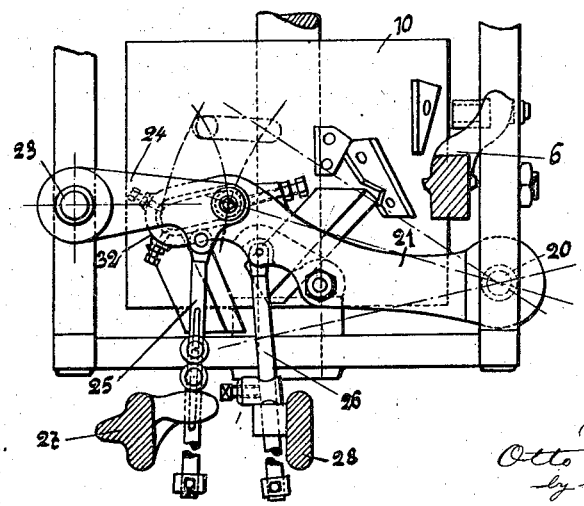
Figure 5:
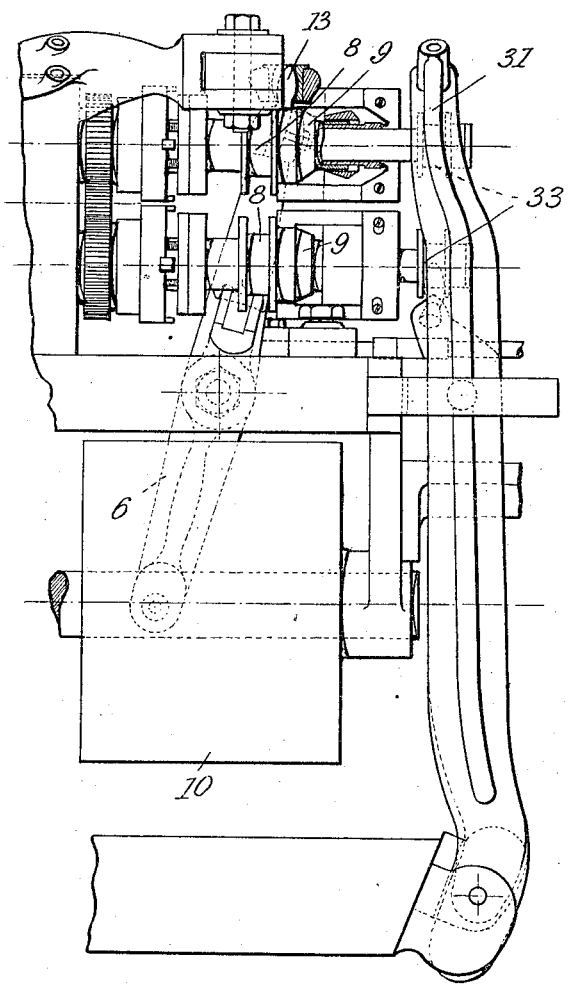
Figure 7:
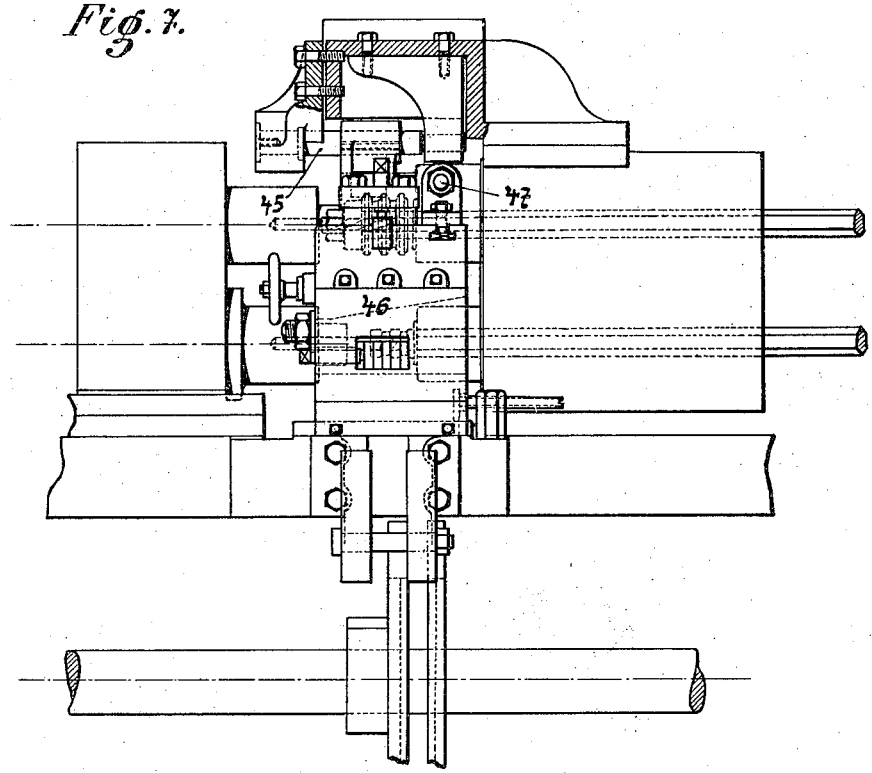

In the accompanying drawing: Figure 1 represents an elevation of a four mandrel lathe embodying my invention; Fig. 2 is a section on line A—B, Fig. 1; Fig. 3 a partial rear view of Fig. 1; Fig. 4 a section on line C—D, Fig. 1; Fig. 5 a rear view of the left hand part of Fig. 1; Fig. 6 a horizontal section on line E—F, Fig. 4, and Fig. 7 a sectional rear view of the center part of Fig. 1.

As represented, the machine is provided with four mandrels 1, 2, 3, 4 driven from a common shaft 5, around which they are intermittently rotated. The machine is further provided with a series of reciprocating tool holders and with means for feeding and clamping the work pieces. The numerals 1–4 do not designate always the same mandrels but identify the mandrels according to their positions. With the lathes as heretofore generally constructed, each of the mandrels had to complete a full rotation around axis 5, before a finished product was turned out, the feed of the material taking place at one point only. By my invention the feed is effected at more than one point, preferably at two points, so that a finished product is obtained during a semi-rotation of the mandrel holder. This is of particular advantage with those articles that do not require a large number of operations in their manufacture, such as nuts, rolls and unthreaded articles. With the known four mandrel lathes, the cycle of operations for producing nuts took place generally in such a way, that at the first mandrel, material was fed for two nuts, and that the facets of the two nuts were turned, while a single nut was drilled. At the second mandrel the first nut was cut off, at the third mandrel the second nut was drilled, while at the fourth mandrel, the second nut was cut off. In this way, there was obtained at each partial rotation of the mandrel holder 7, a complete nut at mandrels 2 and 3.

In order to increase the output of the machine, the cycle of operations has been so devised, that mandrel 1 performs the work of former mandrels 1 and 2, while mandrel 2 performs the work of former mandrels 3 and 4. In this way a complete nut is turned out for each mandrel, at each partial rotation of the mandrel holder.

In order to obtain the above result, the machine must be provided with a duplex feed. Each mandrel carries a flanged collar 8 having a coniform projection 9, and which when shifted is designed to either clamp or release the work piece. The collars were heretofore shifted upon each partial rotation of the mandrel holder 7, at that mandrel only which corresponds to mandrel 1. The shifting is effected by a lever 6 operated by a cam 10, and turning on trunnions 11. Lever 6, by slide block 12, engages collar 8, and thus imparts the required reciprocative motion thereto. With my machine, however, lever 6 is provided with an arm or extension which by ball and socket joint 13 is connected to a bent lever 15 turning on pivot 14. Lever 15 carries a slide block 16 which engages collar 8 of mandrel 3, and thus shifts such collar, in like manner as slide block 12 shifts ring 8 of mandrel 1, so that in this way the work pieces of spindles 1 and 3, are clamped and released approximately at the same time.

In order to advance the material, a feeding device engages the same between the time it is clamped and released, such feeding device operating simultaneously for two mandrels. Cam 10 turns a lever 21 on pivot 20, and this lever by a pin and slot connection turns a second lever 24 on pivot 23. Levers 24, 21 are respectively connected by rods 25, 26 to levers 27, 28, turning on pivots 29, 30. Levers 27, 28 carry at their upper ends slide blocks 31, 32 engaging rings 33 (Figs. 1 and 5). The clamping and feeding devices of mandrels 1 and 3, so operate, that the work is first released at both mandrels, is then advanced under the action of a suitable tension mechanism and is then clamped, the feeding device being subsequently retracted by overcoming the tension mechanism.

In order to obtain a uniform feed, the work-piece of mandrel 1 is pressed against an abutment 40 turning on fulcrum 41, and swung into its operative position by eccentric 42 which is adapted to engage a roller 43 of abutment 40. For mandrel 3, there is provided an abutment 44 turning on fulcrum 45 and operated by means of a slide 46 and draw bar 47. The play of stop 44 may be regulated by adjusting nuts 48, 49. Slide 46 is provided with a faceted blade 50, which on being moved away from the work piece carried by mandrel 3, so operates the slide that the abutment 44 is brought into the path of mandrel 3. When the slide approaches the workpiece, the stop clears the path of the material, before the facet blade and the spiral drill come into action.

The facet blade 50 and its operating means are similar to the facet blade 51 of mandrel 1 and its operating means 39, but with the difference that the ratio of the two arm lever 52, 53, that transmits motion from eccentric 54 to slide 46 is variable. This is accomplished by providing a plurality of perforations 56 for the axis of lever 52, 53, which register with corresponding apertures in the lever, so that by inserting a cotter pin into the proper apertures, the ratio between the lever arms may be altered. The slide carrying the facet blade 51 of mandrel 1, is also provided with a cutting tool 57. This blade which was heretofore used for severing the first of the two nuts, from the stock fed to mandrel 1, is now used for cutting off the second nut. In like manner, the slide 46 carries a cutting tool 58, which while heretofore used for severing the second nut from the stock fed to mandrel 1, is now used for cutting off the second nut from the stock fed to mandrel 3.

For cutting off the first nuts from mandrels 1 and 3, there are employed a pair of cutters 59, 60, having a common holder 61, which is rotatable on axis 5. This holder carries a block provided with a pin 62 engaging an eye 66 of a rod 65, which is influenced by a spring 63, and guided in a rectilinear direction by bearing 64. A roll 67 hung in the lower end of rod 65, is by spring 63 forced against a wedge 68, carried by a draw bar 69 (Fig. 3). The latter receives its motion through a roll 70 and a spring 71 from cams 72, 73, the cam 72 serving to impart to the cutter a slow advance motion, and the cam 73 serving to impart a quicker return motion thereto.

Owing to the repeated forward movements during each rotation of the mandrel, the machine is adapted to simultaneously produce articles of different lengths or shapes, or made from work pieces of different lengths.

The joints 13, 14 are so formed, that slide block 16 may be readily disconnected from lever 6, so that the slide block cannot cause mandrel 3 to become loosened. So also the slide block 31 may be put out of action by severing one of its connecting parts with lever 21, and thus prevent a feed of material at mandrel 3. When the feeding device for mandrel 3 has been stopped, the machine may be used for producing intricate articles, which require a full rotation of the mandrel holder for their completion.

In lieu of the cutting blades 59, 60 different blades may be used. So also the abutment 44 for mandrel 3, may be replaced by an edge tool, so as to increase the number of tools used for producing complicated articles.

I claim:

1. In a multiple turret lathe, a rotatable holder, a plurality of mandrels carried thereby, means for feeding work pieces to said mandrels, a rotary cam, a pair of operatively connected levers actuated thereby, and means controlled by said levers for simultaneously operating the work piece feeding means of two of the mandrels.

2. In a multiple turret lathe, a rotatable holder, a plurality of mandrels carried thereby, clamping rings on the mandrels, a rotary cam, a pair of operatively connected first levers actuated thereby, a pair of second levers operated by the first levers, and slide-blocks on said second levers which engage the rings of two of said mandrels.

3. In a multiple turret lathe, a rotatable holder, a plurality of mandrels carried thereby, means for clamping work pieces to said mandrels, a rotary cam, a first lever actuated thereby and operatively connected to the clamping means of one of the mandrels, and a second lever removably pivoted to the first lever and adapted to be operatively connected to the clamping means of another mandrel.

Signed by me at Barmen, Germany, this 2nd day of September 1909.

OTTO CRELL. [L. S.]

Witnesses:
OTTO KÖNIG,
CHAS. J. WRIGHT.